United States Patent [19]

Snouffer

[11] 4,056,474
[45] Nov. 1, 1977

[54] STRAINING VALVES

[76] Inventor: William N. Snouffer, 111 Buena Vista Way, Chapel Hill, N.C. 27514

[21] Appl. No.: 678,170

[22] Filed: Apr. 19, 1976

[51] Int. Cl.² ............................................. B01D 35/02
[52] U.S. Cl. .................................. 210/390; 210/391; 210/446
[58] Field of Search ............... 137/544, 545, 547, 549, 137/550; 210/390, 447, 449, 460, 499, 391, 446

[56] References Cited

U.S. PATENT DOCUMENTS

| 456,242 | 7/1891 | Ebert | 210/390 |
|---|---|---|---|
| 488,621 | 12/1892 | West | 210/390 |
| 780,334 | 1/1905 | Freeman | 210/390 |
| 808,910 | 1/1906 | Dunham | 210/390 |
| 3,348,694 | 10/1967 | Smith | 210/390 |

FOREIGN PATENT DOCUMENTS

| 253,340 | 11/1912 | Germany | 137/549 |

*Primary Examiner*—Martin P. Schwadron
*Assistant Examiner*—Richard Gerard

[57] ABSTRACT

A self-cleaning straining valve having an inlet, an outlet, and a flush port, in which a rotatable plug has a plug flow passage therethrough, the plug flow passage has, in addition to first and second openings at its two ends, a third opening therefrom through the plug wall, and first and second filter areas are respectively positioned in the first and third openings, the third opening communicating with the valve inlet and the first opening communicating with both the inlet and the flush port when the plug is rotated so that the valve is in a self-cleaning position, whereby in this self-cleaning position part of the incoming fluid from the inlet flows across the first filter area and then out the flush port, to clean the first filter area, and part of the incoming fluid passes through the second filter area, being filtered as it passes therethrough, then passes into the plug flow passage, and finally passes out through the first filter area and flush port, to backflush and thereby to further clean the first filter area. There is also disclosed, for a straining valve, a closed cylindrical filter, the ends and wall of which are made of filtering material.

7 Claims, 5 Drawing Figures

STRAINING VALVES

BACKGROUND OF THE INVENTION

This invention relates to straining valves.

Freeman U.S. Pat. No. 780,334 describes a self-cleaning straining valve in which a filter mounted on a plug is rotated 90° so as to be backflushed and thereby cleaned by incoming fluid. In Crocker U.S. Pat. No. 229,384 the filter has two parallel screens, and cleaning is again done by back-flushing after rotating the filter 180°. In Smith U.S. Pat. No. 3,348,694 the filter is a vertical, cut away cylindrical screen, open at its ends, and cleaning is also performed by backflushing, but with fluid added from outside the fluid line. It would be desirable to retain this backflushing feature in a self-cleaning straining valve while at the same time providing a further means for cleaning the filter by passing fluid across its clogged face.

SUMMARY OF THE INVENTION

The invention provides a simple, inexpensive, easy-to-manufacture, versatile, and convenient-to-use self-cleaning straining valve and a filter for a straining valve.

The straining valve of the invention has a filter that can be cleaned on-line both by backflushing from incoming fluid and by passing incoming fluid across the clogged face of the filter. The valve has relatively few parts, and is easy to disassemble for cleaning and replacement of parts. Self-cleaning of the valve filter can be accomplished quickly, without the need for adding additional fluid from outside the fluid line or for removing caps or manipulating additional valves. However, if desired, on-line brushing of the filter is easy to accomplish. The filter of the invention is simple but effective, and is easily replaceable if it is worn or if a different filter pore size is desired. The invention has a variety of applications ranging from industrial fluid flow systems to agricultural spraying systems, including portable tank sprayers.

The invention features in one aspect a straining valve comprising a body having an inlet, and outlet, and a flush port, a rotatable valve plug seated in the body and having a plug flow passage for fluid to pass therethrough from inlet to outlet when the plug is rotated to a first valve-open position, the plug passage having, in addition to first and second openings at its two ends, a third opening therefrom through the plug wall, and first and second filter areas respectively positioned in the first and third openings, the third opening communicating with the valve inlet and the first opening communicating with both the inlet and the flush port when the plug is rotated so that the valve is in a second, self-cleaning position, whereby in this self-cleaning position part of the incoming fluid from the inlet flows across the first filter area and then out the flush port, to clean the first filter area, and part of the incoming fluid passes through the second filter area, being filtered as it passes therethrough, then passes into the plug flow passage, and finally passes out through the first filter area and flush port, to backflush and thereby to further clean the first filter area. In another aspect the invention features a filter for a straining valve comprising a closed cylinder, the ends and wall of which are made of filtering material.

In preferred embodiments, the third plug passage opening intersects the first opening to cooperatively provide a first laterally enlarged plug flow passage opening in which the first and second filter areas are positioned; the plug is rotatable to a third position in which the second filter area faces the incoming fluid, the first filter area faces the flush port, and all self-cleaning is done by backflushing; both plug flow passage ends are laterally enlarged and covered with respective pairs of cooperating filter areas; the first and second filter areas are respectively in end and wall portions of a filter cylinder, and the plug flow passage, in which the filter cylinder is seated, is circular in cross section; the filter cylinder is made of wire mesh; and the valve has a fourth, shutoff position in which a portion of the plug blocks fluid flow downstream from the inlet.

BRIEF DESCRIPTIONS OF THE DRAWINGS

DESCRIPTION OF THE PREFERRED EMBODIMENT

Figure 1:
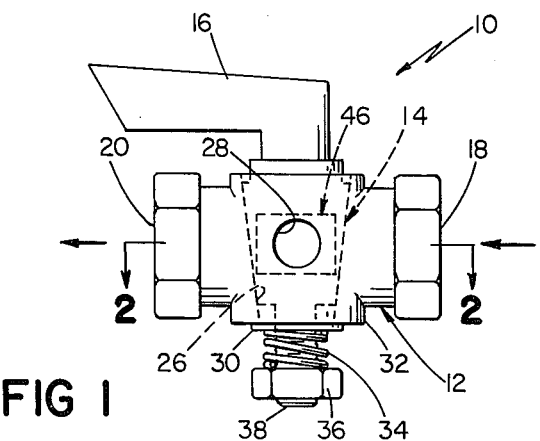
FIG. 1 is a side elevation view of the presently preferred embodiment of the invention.
Figure 5:
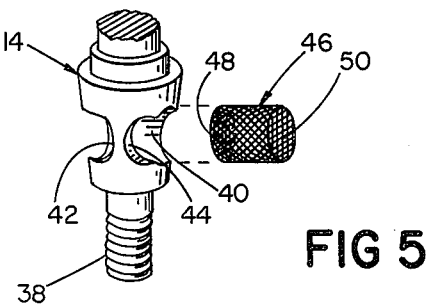
FIG. 5 is a fragmentary isometric view of a portion of the embodiment of FIG. 1, partly broken away.

FIG. 1 shows straining valve 10, which includes brass body 12, brass valve plug 14 seated in body 12, and handle 16 formed integrally with plug 14. As better shown in FIG. 2, body 12 has flanged, internally threaded inlet 18 and outlet 20, permitting threaded coupling of valve 10 between conduits (not shown). Two narrower passages 22, 24 respectively connect inlet 18 and outlet 20 to transverse conical bore 26, which bisects body 12. Flush port 28 communicates with bore 26 midway along body 12. Frustoconical valve plug 14 (shown separately in FIG. 5) is rotatably seated in bore 26, and is held therein by the combination of washer 30, which is seated within flanged opening 32 to bore 26, helical compression spring 34, nut 36, and threaded valve plug extension 38. Tightening nut 36 on plug extension 38 compresses spring 34, thereby increasing the force required to turn handle 16 in order to rotate valve plug 14.

Figure 2:
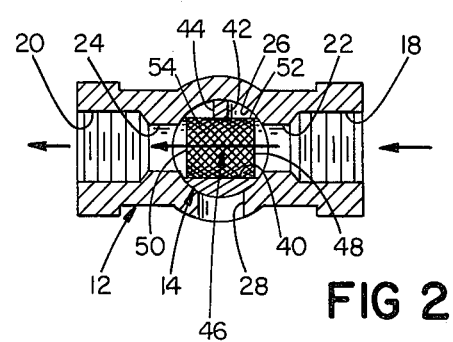
FIG. 2 is a sectional view taken at 2—2 of FIG. 1.

Valve plug 14 contains transverse plug bore 40, which in FIG. 2 is aligned with body passages 22, 24; however, bore 40 has a larger diameter than the diameters of passages 22, 24 as well as that of flush port 28. Two spaced, semicircular ports 42, 44 communicate perpendicularly with bore 40 along one side of the bore, thereby laterally enlarging the two openings of bore 40 on one side of it. Tightly seated within bore 40 is cylindrical filter 46, the ends and wall of which are made of Monel (trademark of International Nickel Co.) nickel-copper alloy wire mesh and are welded together. Filter 46 can be removed from plug 14 when plug 14 is taken out of body 12 (FIG. 5), but cannot be forced out of plug 14 in an assembled valve, because, as with the diameter of bore 40, the outer diameter of filter 46 is larger than the diameters of passages 22, 24, and flush port 28. When assembled in plug 14, filter 46 has an upstream end 48, a downstream end 50, and two portions, 52, 54 of its curved wall that communicate with ports 42, 44 respectively. The location of these parts on a particular filter is not unique because the filter is reversible as well as rotatable in bore 40.

In operation, inlet 18 and outlet 20 are threaded onto conduits (not shown), and handle 16 is positioned as shown in FIG. 1 to open valve 10, permitting fluid to flow in the direction indicated by the arrows from inlet 18 to outlet 20 through body 12. As seen in FIG. 2, in this valve-open position plug bore 40 and filter 46 held therein are axially aligned with the direction of flow. Fluid passes through inlet 18 and passage 22 into bore 40 where it first passes through upstream filter end 48. Solids larger than the mesh size are filtered out of the fluid as it flows through end 48. The filtered fluid then passes through the interior of filter 46, and out through downstream filter end 50, bore 40, passage 24, and outlet 20.

Figure 3:
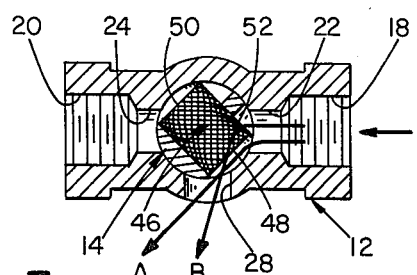
FIG. 3 is a sectional view like that of FIG. 2, except that the valve plug is in a different rotational position.

After filtering has gone on long enough for upstream filter end 48 to become clogged with filtered-out sediment, handle 16 is turned approximately 45° to rotate plug 14 and filter 46 into the position shown in FIG. 3. Upstream filter end 48 is positioned between passage 22 and flush port 28, and forms approximately a 45° angle with the axis of passage 24. Fluid entering passage 22 on meeting filter 46 is divided into two principal paths. As to the first path, indicated generally by arrow A, part of the fluid is diverted by filter end 48 toward and out of flush port 28. As this fluid rushes past the surface of filter end 48, it cleans accumulated sediment from this surface, and carries the sediment out port 28. At the same time, part of the fluid travels the second path, indicated generally by arrow B, whereby it passes through curved wall portion 52 and then passes out through filter end 48 and flush port 28 (downstream flow through filter end 50 is substantially cut off by its being out of alignment with passage 24). Fluid passes through filter end 48 in the direction opposite to that taken by the fluid in the valve-open position of FIG. 2 so that the fluid thereby backflushes filter end 48, dislodging built-up sediment and washing it out port 28, assisted in the latter action by the across-the-surface flow of arrow A. Fluid in both paths thus contributes to the cleaning of filter end 48. Furthermore, the wall of filter 46 and end 50 together prevent sediment from getting behind filter end 48 and flowing downstream to passage 24 when plug 14 is rotated back to the position of FIG. 2.

Figure 4:
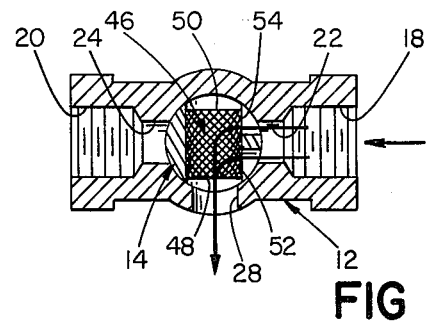
FIG. 4 is a sectional view like that of FIG. 2, but with the valve plug in still another rotational position.

Further cleaning of filter end 48 is provided by turning handle 16 approximately another 45° in the same direction until filter 46 is positioned perpendicular to the axis of passage 22 and both curved filter wall portions 52, 54 are exposed to incoming fluid (FIG. 4). As indicated by arrows, fluid passes through both filter wall portions 52, 54, and then passes out through filter end 48, backflushing it and thus forcing out sediment not already cleaned out in the FIG. 3 position. All the fluid contributes to the backflushing effect in FIG. 4 instead of only a portion as in FIG. 3. Handle 16 can now be turned back to the position of FIG. 1 to resume on-line filtering. It should be noted that the depiction of valve positions in FIGS. 3 and 4 is not meant to suggest that no cleaning can occur in intermediate positions. Rather, in use handle 16 can be conveniently, continuously, and quickly rotated from FIG. 1 to FIG. 4, and some cleaning will occur throughout the rotation from FIG. 3 to FIG. 4.

Valve 10 also has a shutoff position (not shown) achieved simply by turning handle 16 from the position of FIG. 1, 90° in the opposite direction to that taken to reach the position of FIG. 4. The wall of valve plug 14 will block flow beyond passage 22, thus providing the shutoff.

More thorough cleaning of filter end 48 can be achieved without removal of valve 10 from the fluid line and without disassembly of it. One just turns off flow upstream of valve 10, then turns handle 16 to rotate filter 46 into the position of FIG. 4. Filter end 48 will then be aligned with flush port 28, and can be cleaned with a stiff brush through the port. Flow is then resumed to flush away particles loosened by the brush. Similarly, curved filter wall portions 52, 54 can be brushed through port 28 if flow is turned off upstream and handle 16 is further turned beyond its position in FIG. 4 to expose consecutively and fully portions 52 and 54 for brushing.

Valve 10 can easily be removed from the fluid line and disassembled for even more thorough cleaning or replacement of parts. After unscrewing inlet 18 and outlet 20 from their respective conduits, one unscrews nut 36 from plug extension 38, removes spring 34 and washer 30, and lifts valve plug 14 out of body 12 by handle 16. Filter 46 is then pushed out of plug 14. A completely encrusted or corroded filter 46 can easily be replaced with another filter, and, if desired, as for example because of the use of a different fluid containing different-sized sediment, a filter having a different mesh size can be chosen.

Other embodiments within the invention, such as the use of a ball instead of frustoconical plug 14, will be apparent to those skilled in the art. Likewise, other materials could be used, such as plastic for valve body 12 and plug 14, and stainless steel or bronze wire mesh for filter cylinder 46, which could be soldered together instead of welded. To facilitate manufacture of cylinder 46, one end of it could be made slightly recessed within the surrounding cylinder wall, although the recessed end should then be used as downstream end 50 and the flush end as upstream end 48.

What is claimed is:
1. A straining valve comprising:
a body having an inlet, an outlet, a chamber for accommodating a valve plug, said chamber being between and communicating with said inlet and outlet, and a flush port between said inlet and outlet and communicating with said chamber,
a valve plug seated in said chamber and having an axis of rotation, said plug having a plug flow passage therethrough directed transverse of said axis, said plug flow passage having first and second openings at the ends of said passage, said openings respectively aligning with said inlet and outlet for permitting fluid to flow from inlet to outlet when said plug is rotated to a first, valve-open position, and said plug passage having a third opening therefrom through the wall of said plug between said first and second openings, said first opening being large enough to communicate with both said inlet and said flush port when said plug is rotated to a second self-cleaning position, in which position said third opening communicates with said inlet, and
a first filter area positioned in said first opening, and a second filter area positioned in said third opening, wherein said first filter area filters fluid passing from inlet to outlet in said first, valve-open position, and in said second position part of the fluid from said inlet flows across said first filter area and then out said flush port, to clean said first filter area, and part of the fluid from said inlet passes through said sec- ond filter area and is filtered as it passes therethrough, then passes into said plug flow passage, and finally passes out through said first filter area and flush port, to backflush and thereby to further clean the first filter area.

2. The straining valve of claim 1 wherein said third opening intersects said first opening to cooperatively provide a first laterally enlarged plug flow passage opening in which said first and second filter areas are positioned.

3. The straining valve of claim 2 wherein said plug is rotatable to a third position in which said first filter area is positioned adjacent said port, said second filter area is exposed to incoming fluid, and said incoming fluid passes through said second filter area and out said first filter area and said port, to backflush and thereby to clean said first filter area.

4. The straining valve of claim 3 wherein said plug passage has a fourth opening thereform through the wall of said plug, said fourth opening intersects said second opening to cooperatively provide a second laterally enlarged plug flow passage opening, said valve has a third filter area positioned in said second enlarged opening, and said third filter area is exposed to incoming fluid in said third position so that incoming fluid can pass through either said second or third filter area and out through said first filter area.

5. The straining valve of claim 3 wherein said plug is rotatable to a fourth position in which a portion of said valve plug prevents flow fo fluid beyond said inlet, thereby shutting off said valve.

6. The straining valve of claim 1 further comprising a filter cylinder wherein said plug flow passage is circular in cross section, said first and second filter areas are respectively in end and wall portions of said filter cylinder, and said filter cylinder is seated within said plug passage.

7. The straining valve of claim 6 wherein said filter cylinder, including the wall and both ends thereof, is made of wire mesh.

* * * * *